United States Patent
Neuse et al.

(10) Patent No.: US 9,218,207 B1
(45) Date of Patent: Dec. 22, 2015

(54) CONFIGURING VIRTUALIZATION ENVIRONMENTS

(71) Applicants: Douglas Neuse, Austin, TX (US); Laurence Clay, Austin, TX (US); Balaji Varadaraju, Austin, TX (US)

(72) Inventors: Douglas Neuse, Austin, TX (US); Laurence Clay, Austin, TX (US); Balaji Varadaraju, Austin, TX (US)

(73) Assignee: CA, Inc., New York, NY (US)

( * ) Notice: Subject to any disclaimer, the term of this patent is extended or adjusted under 35 U.S.C. 154(b) by 171 days.

(21) Appl. No.: 13/937,878

(22) Filed: Jul. 9, 2013

(51) Int. Cl.
*G06F 9/455* (2006.01)
*G06F 9/50* (2006.01)

(52) U.S. Cl.
CPC ............................. *G06F 9/5016* (2013.01)

(58) Field of Classification Search
None
See application file for complete search history.

(56) References Cited

U.S. PATENT DOCUMENTS

| | | | | |
|---|---|---|---|---|
| 6,985,937 | B1* | 1/2006 | Keshav et al. | 709/223 |
| 7,693,983 | B1* | 4/2010 | Gupta et al. | 709/224 |
| 7,957,948 | B2* | 6/2011 | Zink et al. | 703/13 |
| 8,352,608 | B1* | 1/2013 | Keagy et al. | 709/226 |
| 8,935,701 | B2* | 1/2015 | Bakman | 718/104 |
| 2006/0184937 | A1* | 8/2006 | Abels et al. | 718/1 |
| 2006/0230407 | A1* | 10/2006 | Rosu et al. | 718/105 |
| 2006/0242647 | A1* | 10/2006 | Kimbrel et al. | 718/104 |
| 2007/0043860 | A1* | 2/2007 | Pabari | 709/224 |
| 2008/0222638 | A1* | 9/2008 | Beaty et al. | 718/100 |
| 2008/0244525 | A1* | 10/2008 | Khalil et al. | 717/124 |
| 2008/0295096 | A1* | 11/2008 | Beaty et al. | 718/1 |
| 2009/0281846 | A1* | 11/2009 | Rose | 705/7 |
| 2009/0300173 | A1* | 12/2009 | Bakman et al. | 709/224 |
| 2010/0046377 | A1* | 2/2010 | Ryan et al. | 370/241 |
| 2010/0287559 | A1* | 11/2010 | Mergen et al. | 718/103 |
| 2010/0333105 | A1* | 12/2010 | Horvitz et al. | 718/105 |
| 2011/0161851 | A1* | 6/2011 | Barber et al. | 715/769 |
| 2012/0137002 | A1* | 5/2012 | Ferris et al. | 709/226 |
| 2012/0151480 | A1* | 6/2012 | Diehl et al. | 718/1 |
| 2012/0246638 | A1* | 9/2012 | He et al. | 718/1 |
| 2012/0266026 | A1* | 10/2012 | Chikkalingaiah et al. | 714/38.1 |
| 2013/0007753 | A1* | 1/2013 | Jain | 718/103 |
| 2013/0086235 | A1* | 4/2013 | Ferris | 709/223 |
| 2013/0339759 | A1* | 12/2013 | Doddavula | 713/300 |
| 2014/0358471 | A1* | 12/2014 | VanGilder et al. | 702/130 |

OTHER PUBLICATIONS

VMware, Inc., VMware Distributed Resource Scheduler (DRS) 1-3 (2009).

* cited by examiner

*Primary Examiner* — Emerson Puente
*Assistant Examiner* — Mehran Kamran
(74) *Attorney, Agent, or Firm* — Baker Botts L.L.P.

(57) ABSTRACT

A method includes determining historical resource metrics for a host, and determining a workload forecast for the host based on the historical resource metrics. The method also includes determining a first series of virtual resource configurations based on the workload forecast. Each virtual resource configuration corresponds to a respective virtual machine of a plurality of virtual machines from the host. Each virtual resource configuration includes a time interval of the workload forecast, a processing specification of the corresponding virtual machine, and a host assignment indicative of a corresponding target host of the plurality of hosts on which to run the corresponding virtual machine. The method further includes configuring each respective virtual machine according to each corresponding virtual resource configuration in the first series of virtual resource configurations.

18 Claims, 3 Drawing Sheets

CONFIGURING VIRTUALIZATION ENVIRONMENTS

BACKGROUND

The disclosure relates generally to virtualization environments, and more specifically to a system and method for configuring virtualization environments.

SUMMARY

According to one embodiment of the disclosure, a method includes determining historical resource metrics for a host of a plurality of hosts. The method also includes determining a workload forecast for the host based on the historical resource metrics. Determining the workload forecast includes predicting future resource metrics for the host. The method further includes determining a first series of virtual resource configurations based on the workload forecast. Each virtual resource configuration corresponds to a respective virtual machine of a plurality of virtual machines from the host. Each virtual resource configuration includes a time interval of the workload forecast indicative of a time span over which to run the corresponding virtual machine. Each virtual resource configuration also includes a processing specification of the corresponding virtual machine. The processing specification is determined based on the workload forecast and the time interval. Each virtual resource configuration further includes a host assignment indicative of a corresponding target host of the plurality of hosts on which to run the corresponding virtual machine. The method additionally includes configuring each respective virtual machine according to each corresponding virtual resource configuration in the first series of virtual resource configurations.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Cloud and data center management goals include balancing resource consumption across hosts and provisioning resource consumers (e.g., virtual machines) with adequate, but not excessive, resources to meet demand. Merely configuring resources based on immediate demand without forecasting future resource consumption patterns provides suboptimal resource distribution and application performance. This is often because modern information technology workloads are highly variable. For example, if a system administrator observes increased demand for a particular application and increases the resources accordingly, it is likely that the demand fluctuation will revert to normal levels before, or immediately after, the respective resources have been provisioned. The re-configuration process often requires additional resources to provision the, in this case, unused resources, and further reserves resources that could be used by another application.

Often, demand for computing resources fluctuates widely and dynamically. Additionally, applications, virtual machines, and physical servers exhibit little uniformity in resource demand. Systems and administrators that reactively deal with resource consumption issues often disrupt operations precisely when they are most needed. In the above example where the system administrator increases resources in accordance with increased demand, the provisioning processes themselves may tax the very computing resources that are already in high demand, thus exacerbating performance issues.

The above example is indicative of the give-and-take exhibited in data center configuration management. On the one hand, optimal configurations can be obtained by rapidly adjusting available resources to closely conform to forecasted demand. On the other hand, re-configuring a virtual environment depletes resources and is not immediately effective. Without such re-configuration costs, closely tailoring resource deployment theoretically produces the best performing and lowest cost configuration.

Figure 1:
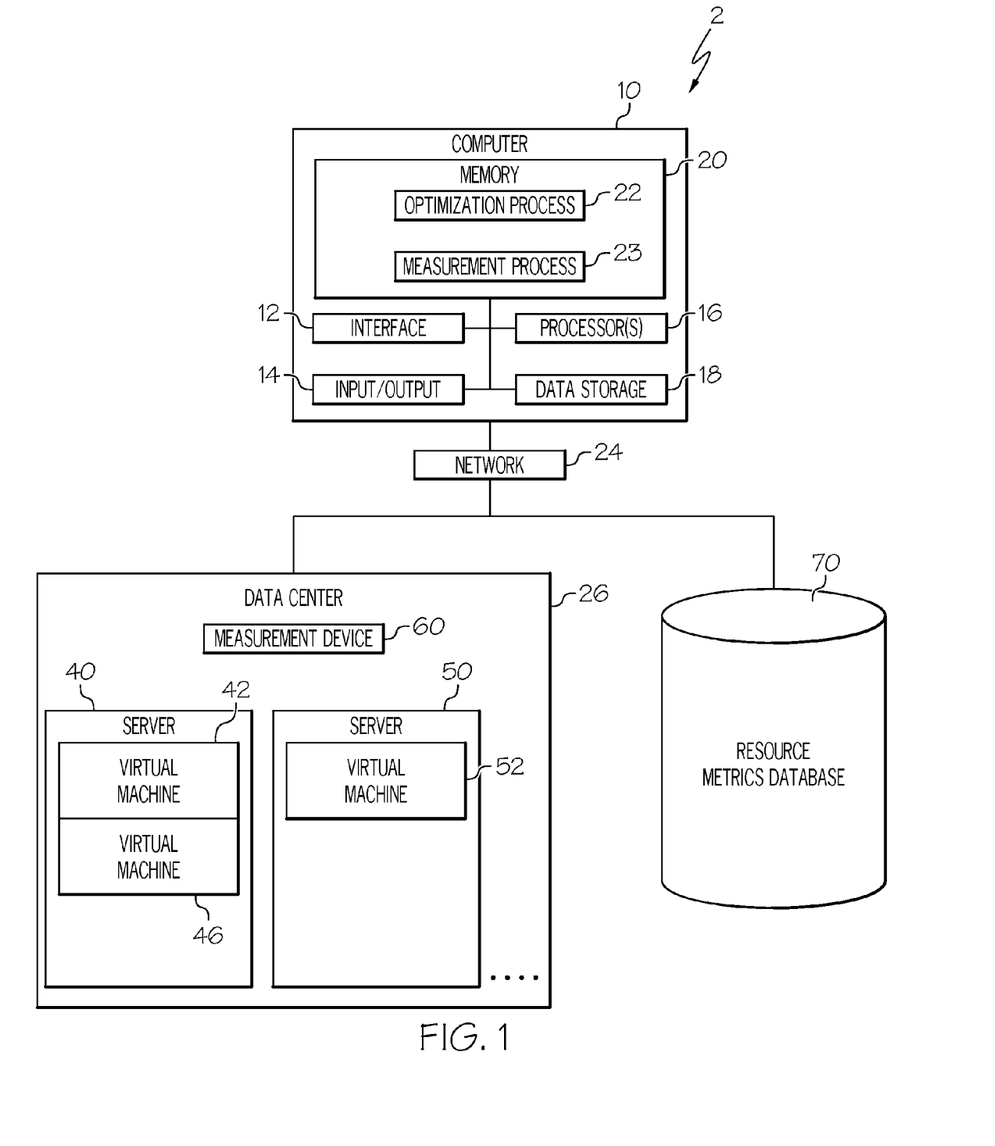
FIG. 1 illustrates a block diagram of a system for configuring virtualization environments in accordance with a non-limiting embodiment of the present disclosure.

In reference to FIG. 1, a system 2 for configuring virtualization environments is illustrated in accordance with one particular embodiment of the present disclosure. System 2 includes a computer 10, data center 26, and resource metrics database 70. Computer 10 includes a memory 20 and processor(s) 16 configured to run a measurement process 23 and an optimization process 22. In certain embodiments, measurement process 23 gathers resource metrics for data center 26 using measurement device 60 and resource metrics database 70. Optimization process 22 determines a workload forecast for data center 26 using the metrics from measurement process 23. Optimization process 22 determines a data center configuration schedule. The data center configuration schedule contains a series of data center configurations, and each data center configuration is created to optimize the configuration of the resources or configuration items ("CI's"). For example, CI's include server 40, server 50, virtual machine 42, and other components in data center 26. Optimization process 22 configures data center 26 according to the data center configuration.

In certain embodiments, optimization process 22 displays the data center configuration schedule, and receives a tradeoff value (e.g., from a user) that indicates a desire to increase optimization or decrease re-configuration costs. Using the tradeoff value, optimization process 22 modifies the data center configuration schedule by modifying the data center configurations to reflect the tradeoff value. Optimization process 22 configures data center 26 resources in accordance with the modified data center configuration schedule.

In certain embodiments resource metrics include consumption and capacity metrics. For example, resource metrics database 70 includes capacity and consumption metrics for the resources embodied in data center 26.

Computer 10 includes memory 20, an interface 12, input/output 14, processor(s) 16, and a data storage 18. Examples of computer 10 include any desktop, laptop, mobile computing device, hand-held device, tablet, thin-client, or thick-client machine capable of performing optimization process 22 and measurement process 23 steps. In certain embodiments, optimization process 22 and measurement process 23 run on a web server on a remote machine, and are accessed by use of computer 10 via, for example, a web browser. Other embodiments of the present disclosure embed computer 10 within data center 26, and enable remote and/or local physical access to computer 10, optimization process 22, and measurement process 23.

Processor(s) 16 is configured to load program instructions into memory 20 and execute optimization process 22 and measurement process 23. Input/output 14 includes any display, drives, mouse, keyboard, or any other peripheral input and output device. Interface 12 enables communication via network 24, and further enables communication to data center 26 and resource metrics database 70, as well as any other system connected to network 24. Interface 12 enables communication from computer 10 via any wireless, wireline, cellular, or other network.

Data center 26 includes any execution or virtualization environment. Example data centers include a cloud, a single data center, a subset of a data center, a server, a cluster of servers, or a collection of data centers. The illustrated embodiments in the present disclosure deal mainly with a cloud data center environment. However, the embodiments in the present disclosure are merely illustrative, and should not be interpreted as limiting the teachings to such environments.

Data center configurations include any allocation of virtual resources to consumers. An example data center configuration includes, allocating virtual machines, services, or applications to servers. Another example data center configuration includes allocating virtual machines, services or applications to resource pools. Still another example data center configuration includes virtual machine placement on a host. One of ordinary skill in the art will appreciate that other changes to the virtual configuration of a data center are encompassed within this term.

Data center configuration schedules include a series of chronologically listed data center configurations strung together to continuously manage data center resources. Optimization intervals include the time during which a particular data center configuration is implemented. For example, a data center configuration schedule is generated to govern virtual resource configurations in data center 26 for a typical workday. The data center configuration schedule indicates 3 shifts in desired resource configuration corresponding to: low resource demand from 12:00 a.m. until 7:00 a.m.; moderate resource demand from 7:00 a.m. to 12:00 p.m.; heavy resource demand from 12:00 p.m. to 7:00 p.m.; and low resource demand from 7:00 p.m. to 11:59 p.m. Such a data center configuration schedule is typical of data centers servicing a national employee user-base during work-hours.

In certain embodiments, resources may be optimized such that resource balance is achieved. Resource balance may include equal normalized resource consumption headroom with respect to available resource capacity. However, in other embodiments, other definitions of resource balance may be applied and/or added to the above definition without departing from the scope of the present disclosure.

Increasing an optimization interval (e.g., span between re-configurations) will generally decrease re-organization costs, because less re-configuration is required. Using the above example, if resource ramp-up was more closely tailored to actual use, more re-configurations would be required. For example, in the evening hours of 4:00 p.m. to 7:00 p.m., most east coast employees have left work for the day, while west coast employees are in the middle of their most productive work hours. Switching to a moderate resource demand schedule during these hours may potentially conserve marginal power resources; however, modifying the configuration may, alone, consume more resources than the configuration change will conserve. The system administrator in this example found the tradeoff value between minimizing re-configuration costs and maximizing optimization benefits did not demand a re-configuration for this interval, and thus the optimization interval was set at 7 hours.

In certain instances, however, decreasing an optimization interval is preferred. Using the above example, if a system administrator notices declining resource demand in the 4:00 p.m. to 7:00 p.m. range, then she may decide it is worth the re-organization cost to re-configure the data center to a moderate resource demand data center configuration for that period.

Frequent optimizations (i.e., short optimization intervals) often disrupt data center operations, especially when implemented in a reactive scheduling system. Reactive scheduling systems determine configuration schedules immediately based on recently collected data. While the embodiments of the present disclosure may include some reactive scheduling, pure reactive scheduling systems are often problematic. First, lag between resource demand and virtual resource loading leads to overreactions. For example, a purely reactive scheduling system reacts to increased resource demand, and reactively provisions a set of new resources to balance the increased load. However, by the time the new resources are provisioned, the demand has declined back to normal operational levels, and the extra resources are never utilized.

Resources include any physical or virtual component of limited availability within a computer system or that is connected to a computer system. Virtual system resources include files, network connections, memory areas, virtual machines, and virtual servers. Other system resources include central processing unit ("CPU") time, random access memory ("RAM") and virtual memory, hard disk space, network throughput, electrical power, external devices, servers and input/output operations.

In particular embodiments, a virtual placement manager ("VPM") is used to implement virtual resource configurations. For example, optimization process 22 keeps track of the data center configuration schedule, and calls a VPM to implement configuration changes on data center 26. In other embodiments, optimization process 22 is implemented inside of a VPM, wherein the VPM provides a user interface for manual configuration of data center 26.

A VPM refers to any process capable of executing data center configurations, and assigning, for example, the specified virtual machines to an optimal host. For example, a VPM facilitates a particular virtual machine configuration in a data center as specified by a user.

Measurement device 60 measures resource utilization via, for example, a gauge, counter, or any other resource measurement device. Measurement device 60 may be implemented in software, or as physical hardware. For example, a gauge measures CPU utilization of virtual machine 42 in data center 26. Measurement process 23 takes readings at periodic intervals of the gauge, modifies the readings, and stores them in resource metrics database 70. Modification is necessary in the above example because CPU utilization is not linear. Those of ordinary skill in the art will appreciate the teachings of the present disclosure as enabling a variety of measurement devices and techniques from which to draw capacity and consumption metrics.

In certain embodiments, capacity and consumption metrics are collected and/or converted into a portable metric unit. A portable metric unit includes a unit independent of the execution environment on which the capacity and/or consumption metric was collected from. For example, portable metric units may allow for comparison of component performance across heterogeneous systems. In certain embodiments, measuring and/or forecasting each resource metric in portable units allows for determination of optimal assignments of virtual machines to hosts and resource pools, and allows for optimal configuration of virtual machines independent of the execution environment on which each virtual machine was previously executed.

Resource metrics database 70 stores capacity and consumption metric data for data center 26. Separate application processes may track and store metric values for various computing components in data center 26 or other data centers connected via network 24.

Those of ordinary skill in the art should interpret the present disclosure as enabling the maintenance of resource allocation and consumption balancing across hosts. The teachings of the present disclosure also enable appropriate configurations of virtual machines while avoiding disruptive and inefficient reactive configuration management methods.

Figure 2:
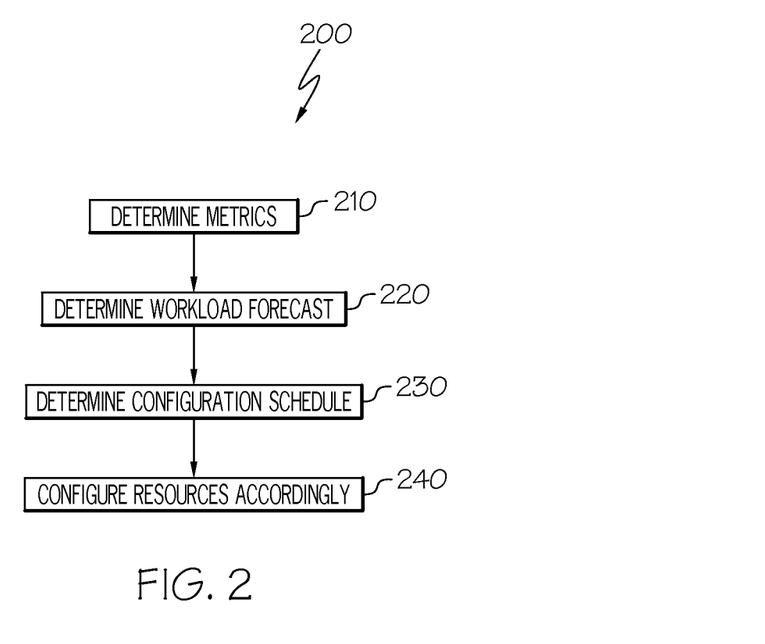
FIG. 2 illustrates a flowchart of a method for configuring virtualization environments in accordance with another non-limiting embodiment of the present disclosure.

In reference to FIG. 2, a method 200 for configuring virtualization environments is illustrated in accordance with another embodiment of the present disclosure. For illustrative purposes, method 200 is discussed in the context of the components of system 2 in FIG. 1. It should be understood by one of ordinary skill in the art that according to the teachings of the present disclosure, that many other system configurations may be utilized in order to perform method 200.

At step 210 historical resource metrics are determined for each host. For example, measurement process 23 measures resource metrics for many servers in data center 26.

At step 220, workload forecasts are determined by, for example, optimization process 22. The workload forecasts are determined by predicting future resource metrics for each respective host. Virtual resource configurations are also determined based on the workload forecasts. The virtual resource configuration elaborates on how to set up each resource, and includes a time interval, a processing specification and a host assignment that indicates a corresponding target host.

In certain embodiments, a processing specification includes the processing capacity and/or power to be included in the virtual resource. For example, a high performance application servicing customer needs may require several virtual resources having high processing capacity. This requirement can be specified by creating several virtual resource configurations with powerful multi-core processors. In certain embodiments, a memory specification includes memory capacity to be included in the virtual resource.

At step 230, The configuration schedule is determined based on the virtual resource configurations for the hosts.

At step 240, each respective virtual resource is configured according to their respective virtual resource configuration. For example, one virtual resource configuration specifies that 10 new virtual machines should be created at 3 p.m. Eastern time in order to service the impending end of day transactions for users. The example virtual resource configuration schedule also specifies each of the created virtual resources will be powered down and taken off line after 6 p.m. Eastern time. Those of ordinary skill in the art will appreciate the complexities and intricacies that can be specified in the configuration schedule as they relate to physical and virtual computing resources.

Figure 3:
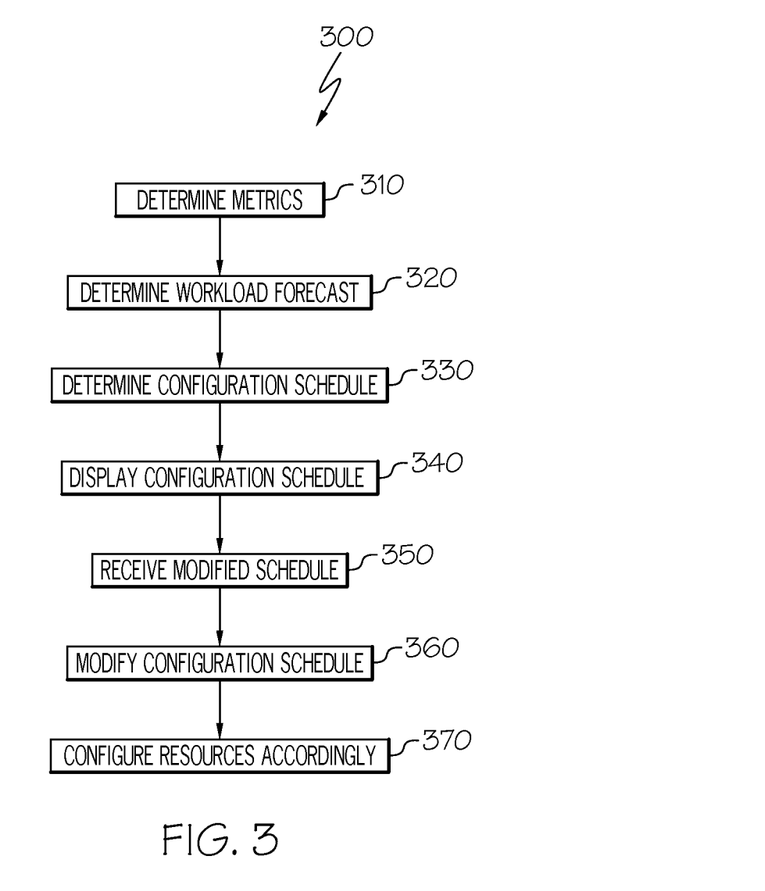
FIG. 3 illustrates a flowchart of a method for configuring virtualization environments in accordance with yet another non-limiting embodiment of the present disclosure.

In reference to FIG. 3, a method 300 for configuring virtualization environments is illustrated in accordance with another embodiment of the present disclosure. For illustrative purposes, method 300 is discussed in the context of the components of system 2 in FIG. 1. It should be understood by one of ordinary skill in the art that according to the teachings of the present disclosure, that many other system configurations may be utilized in order to perform method 300.

At step 310, historical consumption and capacity metrics for a data center are determined. Measurement process 23 may utilize measurement device 60 and a host of other measurement devices in to capture measurement data. Measurement process 23 processes the received data and converts the data to more useful metrics. For example, CPU utilization is captured from a gauge device at measurement device 60. The gauge device is configured to measure CPU utilization of virtual machine 42. Measurement process 23 converts CPU utilization measurements into, for instance, capacity and capacity consumption metrics. Capacity metrics measure the remaining processing capacity and resource availability for certain physical and virtual components. Such metrics may be combined to create more complex metrics. Measurement process 23 stores measurement data and the capacity and consumption metrics into resource metrics database 70.

In another embodiment still as part of step 310, optimization process 22 retrieves measurement data from resource metrics database 70, or an equivalent repository containing measurement data. Optimization process 22 determines consumption and capacity metrics using the retrieved measurement data.

The consumption and capacity metrics reflect a plurality of resources and a plurality of applications in data center 26. For example, virtual machines 42 and 52 support one application while virtual machine 46 supports a separate application. Metrics are determined with respect to both applications and their supporting resources. Since, in virtual environments, resources supporting applications can be dynamically switched out, system 2 maintains detailed information corresponding to which applications are running on which resources so as to determine the proper metrics.

At step 320, workload forecasts are determined for the data center based in part on the consumption metrics. In one embodiment, optimization process 22 queries resource metrics database 70 for metrics related to resources and applications running on data center 26. For example, optimization process 22 queries resource metrics data base 70 for metrics related to all active application and resources running on data center 26 over the past 3 months. In this embodiment, a workload forecast is determined that estimates the future consumption and capacity metrics expected in data center 26. The workload forecast may be modified to account for one-time and recurring events. For example, if a holiday is coming up, certain embodiments allow the user to modify the workload forecast to account for the holiday. However, in certain embodiments, if enough historical data is available, the workload forecast may automatically predict such recurring events. In such situations, users may not be required to modify the workload forecasts for what may appear to be one-time events in the short-term. For example, the workload forecast may predict and account for holidays based on historical metrics.

In certain embodiments, it may be desirable to allow for modifications in order to accommodate upcoming one-time events about which there is no historical data. In such embodiments, the user may be allowed to modify the workload forecast to accommodate such upcoming one-time events.

The workload forecast details application consumption and resource capacity metric predictions for each running application and resource. Further steps utilize information from the forecast to optimize, balance, and re-configure data center 26 operations.

At step 330, a configuration schedule is determined based on the workload forecast. The configuration schedule includes a series of data center configurations, connected together chronologically so as to produce a continuous operation schedule.

The data center configurations include an optimal configuration of the plurality of resources and the plurality of applications running on data center 26 over respective optimization intervals of the workload forecast. For example, optimization process 22 balances virtual machine resources in data center 26 so as to account for forecasted high utilization times. The periods between resource re-configuration are the optimization intervals. Further embodiments include configuration schedules with planned restart times, software update times, and maintenance times.

At step 340, the data center configuration schedule is formatted for display. For example, a display connected to input/output 14 shows the configuration schedule. In another embodiment, a web browser running on computer 10 displays the configuration schedule.

At step 350, a modified schedule is received. The modified schedule indicates a desire to increase or decrease configuration costs. The modified schedule further indicates a desire to increase or decrease optimization or configuration balancing in a data center.

For example, in accordance with the display discussed in connection with step 340, a sliding scale bar is presented to the user. The top of the scale bar indicates a, in this instance, user's desire to increase optimization while the bottom of the scale bar indicates the user's desire to minimize re-organization, or reconfiguration, costs. The user adjusts the scale bar in accordance with her desired optimization level according to the displayed data center configuration schedule.

At step 360, the data center configuration schedule is modified. In certain embodiments, a new data center configuration schedule is generated. In still other embodiments, a data center configuration schedule is generated by modifying the series of data center configurations. In some embodiments, the data center configurations and respective optimization intervals are modified based on the modified configuration schedule received.

A second data center configuration schedule refers to one or more of the result of generating a new data center configuration schedule based on modifications to existing data center configurations, the result of generating a new data center configuration schedule based on new data center configurations, and the result of modifying the existing data center configuration schedule.

In other embodiments, the data center configuration schedule is re-displayed to the user, and the user is free to make manual adjustments as needed. For example, if a known holiday is approaching in which organization applications and resources are expected to be mainly idle, a system administrator may manually modify the data center configuration schedule so as to reflect the expected change.

At step 370 data center 26 is configured according to the configuration schedule. In certain embodiments, modifications are regularly made by creating further workload forecasts and repeating one or more of steps 310 to 370.

In other embodiments, system 2 from FIG. 1 repeatedly optimizes a virtualization environment. For example, system 2 optimizes a virtualization environment via one or more of a scheduled basis, as needed, and in response to specific events. In certain embodiments, new or refined virtual system configurations are determined. For example, system 2 determines a more optimal placement of virtual machines onto hosts and determines a more optimal virtual machine configuration.

Allocation balance includes attempts to balance limited resources according to resource demand to achieve the best performance.

In another particular embodiment, system 2 maintains a cloud or data center environment in a near optimal state while avoiding disruptive and inefficient frequent use of reactive technologies. In separate embodiments, system 2 minimizes the cost of maintaining near optimality by optimizing with respect to forecasted (as opposed to recent) workload activity and refining the current configuration to obtain a satisfactory configuration, rather than creating a new configuration from scratch. In still other embodiments, system 2 allows user control over trade-offs between the cost of re-configuration and the benefits of re-configuration. In further embodiments, system 2 is applied at a variety of time granularities (e.g., move-by-move, hourly, and/or daily). In even further embodiments, system 2 can produce a schedule of moves and other configurations to be implemented over time as well as re-configurations to be implemented immediately. Still in even further embodiments, system 2 can be extended to data center optimization in general. System 2 may further be extended to optimize allocation of storage, networking, bandwidth, or any other finite IT resource.

Other embodiments of system 2 attempt to regularly or continuously perform one or more of the following features in parallel: measuring resource consumption and configuration values and storing the readings in a performance data warehouse; calculating interval, percentile, roll-up and other values from the raw measurements; forecasting workload volumes and resource demands; finding refinements to the current data center configuration that will be near-optimal in the short term (e.g., over an hour) and low cost (e.g., less re-configurations); and implementing refinements (e.g., reconfigurations and right-sizing virtual machines), subject to user-specified cost-benefit tradeoffs).

Certain other embodiments provide user control over the cost-benefit tradeoff. The benefits include reducing risk and improving balance as measured by a placement score. The costs include requiring time and resources to obtain benefits as measured by the number of virtual machine moves or the memory, storage and other resources that must be moved.

Still other embodiments provide application of workload forecasting and machine learning. For example, in order to optimize with respect to future workload demands, not past ones. Application of new workload forecasting techniques may also be applied.

Further embodiments include user control and adaptive frequency of analysis and change. In order to maintain optimal operations, it is necessary to minimize the disruption per change and achieve an equilibrium derived from past experiences. Such equilibrium may evolve slowly over time. Additionally, such techniques avoid costs of frequent employee analysis for predictable resource consumption scenarios such as the standard work day.

Additional embodiments provide advantages to manual and solely reactive resource configuration systems. For example, using workload forecasts as opposed to mere historical workload metrics to determine optimal new configurations provides significant benefit to reactive or manual resource configurations, as discussed above. Continuously calculating and forecasting workload metrics, instead of scheduling such configurations nightly requires less employee time. Performing data collection, data analysis, forecasting, optimization analysis, and new configuration implementations in parallel in one system (e.g., system 2 of FIG. 1) reduces employee time required to integrate several sources of information into one configuration schedule. Providing for a user-controlled tradeoff value between maximizing optimality (e.g., resource balance) and minimizing re-configuration cost) does much of the system administrator's job automatically.

Still different embodiments provide even further benefits. For example, defining cost in terms of the cost of implementing the new configuration as opposed to the cost of finding a new configuration provides new criteria for evaluation and analysis. Particular embodiments allow the user to specify conditions, as opposed to a mere schedule, that triggers the re-running of the optimization analysis. Others optionally adjust the frequency of analysis and change to more appropriately fit the forecasted rate of change in demand. Further embodiments automate the implementation of new configurations as opposed to merely recommending configuration changes. Additional embodiments omit placement initialization and instead refine the current placement.

Still other embodiments enable the user to apply changes at a variety of time granularities. For example, a user changes a data center configuration schedule set up for hourly optimizations to optimize the configuration on a daily basis. After processing, system 2 determines an appropriate configuration schedule for the request.

Further embodiments provide a user interface for immediate re-configuration. For example, emergency conditions may overload a data center with unexpected resource demand. A system administrator can override the data center configuration schedule, and optionally change it, in order to account for the unexpected utilization.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   determining historical resource metrics for a host of a plurality of hosts;
   determining a workload forecast for the host based on the historical resource metrics, wherein determining the workload forecast comprises predicting future resource metrics for the host;
   determining a first series of virtual resource configurations based on the workload forecast, wherein each virtual resource configuration corresponds to a respective virtual machine of a plurality of virtual machines from the host, and each virtual resource configuration comprises:
      a time interval of the workload forecast indicative of a time span over which to run the corresponding virtual machine;
      a processing specification of the corresponding virtual machine, wherein the processing specification is determined based on the workload forecast and the time interval; and
      a host assignment indicative of a corresponding target host of the plurality of hosts on which to run the corresponding virtual machine;
   configuring each respective virtual machine according to each corresponding virtual resource configuration in the first series of virtual resource configurations;
   formatting for display the first series of virtual resource configurations;
   receiving an input indicative of an intent to decrease a re-configuration cost;
   determining a second series of virtual resource configurations by modifying each virtual resource configuration of the first series of virtual resource configurations such that each respective time interval is increased; and
   configuring each respective virtual machine according to each corresponding virtual resource configuration in the second series of virtual resource configurations.

2. The method of claim 1, further comprising:
   receiving a modification to a selected virtual resource configuration, wherein the selected virtual resource configuration corresponds to a selected virtual machine; and
   configuring the selected virtual machine according to the modified selected virtual resource configuration.

3. The method of claim 1, wherein determining the historical resource metrics comprises:
   receiving a plurality of measurements from a measurement device, the measurements comprising:
      consumption measurements indicative of resource consumption of the host; and
      capacity measurements indicative of unused resources available for the host; and
   determining the historical resource metrics as a function of time based on the plurality of measurements.

4. The method of claim 3, wherein determining the historical resource metrics further comprises:
   storing the plurality of measurements in a database; and
   querying the database for respective measurements.

5. The method of claim 1, wherein each virtual resource configuration further comprises:
   a memory specification of the corresponding virtual machine, wherein the memory specification is determined based on the workload forecast and the time interval; and
   a physical resource configuration for the corresponding target host.

6. The method of claim 1, wherein determining the first series of virtual resource configurations is further based on:
   a power utilization of the host; and
   a temperature of the host.

7. A computer configured to access a storage device, the computer comprising:
   a processor; and
   a non-transitory, computer-readable storage medium storing computer-readable instructions that when executed by the processor cause the computer to perform:
      determining historical resource metrics for a host of a plurality of hosts;
      determining a workload forecast for the host based on the historical resource metrics, wherein determining the workload forecast comprises predicting future resource metrics for the host;
      determining a first series of virtual resource configurations based the workload forecast, wherein each virtual resource configuration corresponds to a respective virtual machine of a plurality of virtual machines from the host, and each virtual resource configuration comprises:

a time interval of the workload forecast indicative of a time span over which to run the corresponding virtual machine;
a processing specification of the corresponding virtual machine, wherein the processing specification is determined based on the workload forecast and the time interval; and
a host assignment indicative of a corresponding target host of the plurality of hosts on which to run the corresponding virtual machine;
formatting for display the first series of virtual resource configurations;
receiving a tradeoff value designated by a user;
modifying the first series of virtual resource configurations in accordance with the tradeoff value, resulting in a second series of virtual resource configurations;
configuring each respective virtual machine according to the second series of virtual resource configurations.

8. The computer of claim 7, wherein the computer-readable instructions further cause the computer to perform:
formatting for display the second series of virtual resource configurations;
receiving a modification to a selected virtual resource configuration, wherein the selected virtual resource configuration corresponds to a selected virtual machine; and
configuring the selected virtual machine according to the modified selected virtual resource configuration.

9. The computer of claim 7, wherein the received tradeoff value is indicative of an intent to decrease a re-configuration cost and wherein modifying the first series of virtual resource configurations in accordance with the tradeoff value comprises:
modifying each virtual resource configuration of the first series of virtual resource configurations such that each respective time interval is increased.

10. The computer of claim 7, wherein determining the historical resource metrics comprises:
receiving a plurality of measurements from a measurement device, the measurements comprising:
consumption measurements indicative of resource consumption of the host; and
capacity measurements indicative of unused resources available for the host; and
determining the historical resource metrics as a function of time based on the plurality of measurements.

11. The computer of claim 10, wherein determining the historical resource metrics further comprises:
storing the plurality of measurements in a database; and
querying the database for respective measurements.

12. The computer of claim 7, wherein each virtual resource configuration further comprises:
a memory specification of the corresponding virtual machine, wherein the memory specification is determined based on the workload forecast and the time interval; and
a physical resource configuration for the corresponding target host.

13. The computer of claim 9, wherein determining the first series of virtual resource configurations is further based on:
a power utilization of the host; and
a temperature of the host.

14. A computer program product comprising:
a non-transitory computer-readable storage medium having computer-readable program code embodied therewith, the computer-readable program code comprising:
computer-readable program code configured to determine historical resource metrics for a host of a plurality of hosts;
computer-readable program code configured to determine a workload forecast for the host based on the historical resource metrics, wherein determining the workload forecast comprises predicting future resource metrics for the host;
computer-readable program code configured to determine a first series of virtual resource configurations based on the workload forecast, wherein each virtual resource configuration corresponds to a respective virtual machine of a plurality of virtual machines from the host, and each virtual resource configuration comprises:
a time interval of the workload forecast indicative of a time span over which to run the corresponding virtual machine;
a processing specification of the corresponding virtual machine, wherein the processing specification is determined based on the workload forecast and the time interval; and
a host assignment indicative of a corresponding target host of the plurality of hosts on which to run the corresponding virtual machine;
computer-readable program code configured to configure each respective virtual machine according to each corresponding virtual resource configuration in the first series of virtual resource configurations;
computer-readable program code configured to format for display the first series of virtual resource configurations;
computer-readable program code configured to receive a modification to a selected virtual resource configuration, wherein the selected virtual resource configuration corresponds to a selected virtual machine; and
computer-readable program code configured to configure the selected virtual machine according to the modified selected virtual resource configuration.

15. The computer program product of claim 14, wherein the computer-readable program code further comprises:
computer-readable program code configured to format for display the first series of virtual resource configurations;
computer-readable program code configured to receive an input indicative of an intent to decrease a re-configuration cost;
computer-readable program code configured to determine a second series of virtual resource configurations by modifying each virtual resource configuration of the first series of virtual resource configurations such that each respective time interval is increased; and
computer-readable program code configured to configure each respective virtual machine according to each corresponding virtual resource configuration in the second series of virtual resource configurations.

16. The compute program product of claim 14, wherein determining the historical resource metrics comprises:
receiving a plurality of measurements from a measurement device, the measurements comprising:
consumption measurements indicative of resource consumption of the host; and
capacity measurements indicative of unused resources available for the host; and
determining the historical resource metrics as a function of time based on the plurality of measurements.

17. The computer program product of claim 16, wherein determining the historical resource metrics further comprises:
  storing the plurality of measurements in a database; and
  querying the database for respective measurements.

18. The computer program product of claim 14, wherein each virtual resource configuration further comprises:
  a memory specification of the corresponding virtual machine, wherein the memory specification is determined based on the workload forecast and the time interval; and
  a physical resource configuration for the corresponding target host.

\* \* \* \* \*